Dec. 11, 1951  E. E. JELLISON  2,578,358
SIGNALING DEVICE FOR AUTOMOBILES
Filed March 31, 1947
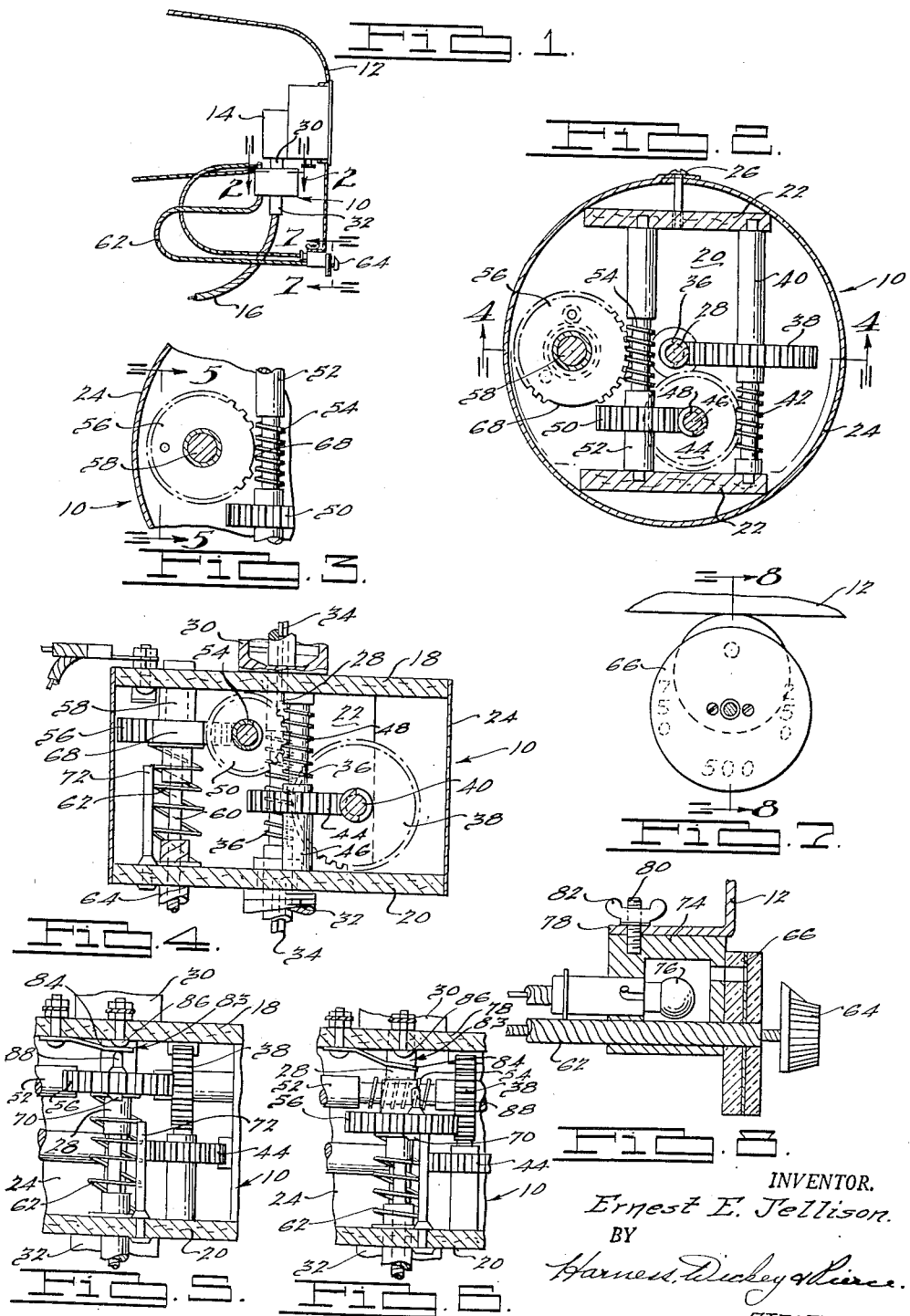
INVENTOR.
Ernest E. Jellison.
BY
Harness, Dickey & Pierce.
ATTORNEYS.

Patented Dec. 11, 1951

2,578,358

UNITED STATES PATENT OFFICE 2,578,358

SIGNALING DEVICE FOR AUTOMOBILES

Ernest E. Jellison, Twin Falls, Idaho

Application March 31, 1947, Serial No. 738,343

2 Claims. (Cl. 177—311)

1

This invention relates to new and useful improvements in signaling devices for automotive vehicles.

An important object of the invention is to provide a signaling device adapted to be inserted between and connected to the speedometer and speedometer cable of an automotive vehicle so as to be driven by the cable, which device includes means preferably located on the instrument panel of the vehicle for indicating visibly when the latter has traveled a predetermined number of miles.

Another object of this invention is to provide a signaling device of the above-mentioned character which is primarily adapted and pre-eminently suited for indicating service requirements, as, for example, when the crankcase oil should be changed.

Another object of this invention is to provide a signaling device of the above-mentioned character in which the visual indicator element also comprises a manual control for resetting the device after each operation.

Yet another object of the invention is to provide a signaling device of the above-mentioned character wherein a dial behind the indicator element is illuminated after each operation to attract the attention of the operator.

Other objects and advantages of the invention will be apparent during the course of the following description.

In the drawing forming a part of this specification, and wherein like numerals are employed to designate like parts through the same.

Fig. 1 is a vertical sectional view through the instrument panel of an automotive vehicle and showing a signaling device embodying the instant invention inserted between and connected to the speedometer cable and the speedometer;

Fig. 2 is an enlarged, horizontal view taken on the line 2—2 of Fig. 1, and particularly illustrating a worm and worm gear arrangement for controlling the cycle of operation of the device;

Fig. 3 is a fragmentary view similar to Fig. 2 showing the manner in which the worm and worm gear referred to in the description of Fig. 2 above are positioned at the end of each cycle of operation;

Fig. 4 is a vertical sectional view taken on the line 4—4 of Fig. 2;

Fig. 5 is a fragmentary, vertical sectional view taken on the line 5—5 of Fig. 3 and particularly showing the manner in which an electrical circuit is closed to illuminate the indicator means;

Fig. 6 is a fragmentary sectional view similar to Fig. 5 showing the contacts which control the electrical circuit in normally open position;

Fig. 7 is an enlarged, fragmentary, vertical sectional view taken on the line 7—7 of Fig. 1; and Fig. 8 is a vertical, longitudinal sectional view taken on the line 8—8 of Fig. 7.

2

In the drawing wherein for the purpose of illustration is shown a preferred embodiment of the invention, the numeral 10 designates a housing adapted to be mounted behind the instrument panel 12 of an automotive vehicle between the speedometer 14 and speedometer cable 16 and to enclose a gear drive and reduction unit.

Any suitable housing 10 may be employed. The one here shown has a generally circular top and bottom 18 and 20 (Fig. 4) which are connected by a pair of opposed, generally rectangular, vertical walls 22 (Fig. 2) and are enclosed by an annular surrounding wall 24. Vertical walls 22 may be fastened to the top 18 and bottom 20 in any suitable manner, as by screws or the like. The annular wall 24 preferably is removable to expose the interior of the housing 10 and conveniently is in the form of an elongated strip of metal or the like wrapped tightly around the top 18 and bottom 20. As best shown in Fig. 2, the annular wall or strip 24 has overlapping marginal edges which are fastened together and to one of the vertical walls 22 by a removable screw 26.

As suggested, the housing 10 contains suitable reduction gearing which provides both a direct drive between the speedometer cable 16 and the speedometer 14, and an auxiliary drive which rotates in timed relation to but much slower than the direct drive. In other words, according to the present invention the speedometer cable is connected to the speedometer through the reduction gearing so that both the gearing and the speedometer are driven by the speedometer cable.

As suggested, it is contemplated that the reduction gearing be used to actuate a signaling device which will indicate when some part of the vehicle requires servicing; for example, the signaling device may be used as a visual indicator to inform the operator when the vehicle requires lubrication or when oil in the crank case should be changed.

More particularly the reduction gearing comprises a main shaft 28 which extends between and is journaled in the top and bottom walls of the housing 10. As best shown in Fig. 4, the upper and lower terminal portions of shaft 28 extend beyond the top 18 and bottom 20 and project into internal and external couplings 30 and 32 respectively, which couplings are adapted for connection with the speedometer 14 and speedometer cable 16, as shown in Fig. 1. Each end of the main drive shaft 28 is formed with a square socket, and these sockets receive correspondingly shaped pins 34 which establish a driving connection between the shaft and associated parts in the speedometer 14 and speedometer cable 16. As will be readily apparent, pins 34 provide substantially universal connections between the main shaft 28 and the connecting members in the speedometer and speedometer cable whereby to compensate for variations in alignment therebetween and to assure essentially smooth operation of the several parts.

The rest of the reduction gearing is clearly shown in the drawings and need not be described in detail since the general construction and purpose is conventional and will be readily apparent to those skilled in the art. The reduction gearing merely comprises a plurality of shafts which are journaled either in the top and bottom 18 and 20 or in the vertical walls 22. These shafts carry worms and/or worm gears which coact in the conventional manner to reduce the rotative speed of drive shaft 28.

For example, the vertical drive shaft 28 is formed with a worm 36 which meshes with a worm gear 38 on horizontal shaft 40 (Fig. 2), and the latter shaft also is formed with a worm 42 which meshes with a worm gear 44 on vertical shaft 46. Shaft 46, in turn, is formed with a worm 48 which meshes with a worm gear 50 on the horizontal shaft 52. A worm 54 also on the shaft 52 meshes with a worm gear 56 which is fixed on a vertical stub shaft 58 and the latter is journaled for rotative and sliding movement in the top 18. Worm gear 56 is movable into and out of engagement with worm 54 but normally is held in engagement therewith by a spring 62 confined between the worm gear and the bottom 20.

Stub shaft 58 is the slow-drive power take-off of the reduction gearing, and a short portion thereof which extends below the gear 56 has a driving connection with a flexible shaft 62, as shown in Fig. 4. The latter extends from the housing 10 to the instrument panel 12, as shown in Fig. 1, and the distal end thereof carries and rotatably drives an indicator knob 64. As will be readily apparent, indicator knob 64 is rotatably and slidably coactive with worm gear 56 through the medium of the internal element of flexible shaft 62, and the knob preferably is positioned on the instrument panel 12 where it is easily visible and conveniently available for manual operation.

If the device is to be used to indicate oil changes, for example, it is desirable that the worm gear 56 and indicator 64 make one complete revolution for every thousand miles traversed by the vehicle. This relationship can be readily obtained by employing the proper gear ratios in the reduction gearing, and a dial 66 is mounted immediately behind the knob 64 to indicate the number of miles traversed by the vehicle.

Under certain conditions or when the device is used for purposes other than indicating oil changes, it may be desirable to reset the indicator knob 64 before it has made a complete revolution or to set the knob initially so that it make less than a complete revolution before completing its operation, and it is a feature of this invention that the knob functions not only as an indicator but also as a manual actuator for the worm gear 56. By pulling on the knob 64, worm gear 56 can be moved axially against the action of spring 62 out of engagement with worm 54. Manifestly, when disengaged from worm 54, the worm gear 56 can be reset without disturbing the rest of the gearing.

Also, it is contemplated as a feature of this invention that the worm gear 56 have a series of teeth cut away, as at 68. By reason of the above, worm gear 56 automatically disengages the driving worm 54 at the end of each operation when the cut-away portion 68 moves into register with the worm. Thus worm gear 56 can be initially positioned with the teeth immediately in front of cut-away portion 68 in engagement with the worm 54 and after making substantially a complete revolution, it will automatically disengage the worm and remain disengaged therefrom until it is reset by manual manipulation of the indicator knob 64. Alternatively, worm gear 56 may be positioned initially in any selected rotative relation with respect to the worm 54 so that knob 64 makes any predetermined angular movement less than a complete revolution before the worm gear automatically disengages the worm. Thus the device can be set to signal the operator when the vehicle has traveled the maximum distance capable of being registered by the device (in the instant example, 1000 miles) or for any distance less than the maximum distance as indicated by the knob 64. (See, for example, Fig. 7.)

In order to control positioning of the worm gear 56 for the resetting operation when it is desired to have the device indicate the maximum distance, the gear is provided with a laterally extending lug 70 (Fig. 5) which is positioned to engage a vertically upwardly extending stop element 72 on the bottom 20 when the worm gear is retracted. In this connection it should be noted that the lug 70 clears stop 72 when worm gear 56 is in mesh with worm 54 and engages the stop only when the worm gear 56 is retracted. Also, lug 70 is located circumferentially on worm gear 56 so that the teeth immediately in advance of cut-away portion 68 are positioned to engage the worm 54 when the lug is against stop 72.

Thus to reset the device for maximum operation it is merely necessary to pull knob 64 outwardly until worm gear 56 disengages worm 54 and then rotate the knob until the lug 70 engages stop 72. Knob 64 is then pushed inwardly to engage worm gear 56 with worm 54, and the device is set for another full cycle of operation. Worm gear 56 remains engaged with worm 54 until it makes substantially a complete revolution or until it is disengaged by manipulation of knob 64 manually in the manner hereinabove described.

Still another feature of the invention resides in the dial 66 which is made of transparent material and is mounted on a hollow housing 74 which contains a lamp 76. Housing 74 conveniently can be fastened to an inturned flange 78 at the lower edge of the instrument panel 12 by means of an upstanding stud 80 and wing nut 82, as shown in Fig. 8. Also, the outer or distal end of the flexible cable 62 preferably is passed through the lower portion of the housing so that the latter holds the cable rigid and immovable for the indicating knob 64.

An electrical circuit is provided which includes the lamp 76 and a switch 83 having normally open movable and fixed contacts 84 and 86 respectively. This switch 83 is normally open and is shown to best advantage in Figs. 5 and 6. It will be observed that worm gear 56 is provided with a laterally extending switch-operating arm 88 and that this arm engages the movable contact 84 to close the switch 83 when the worm gear 56 moves into position to disengage worm 54.

Thus at the end of each cycle of operation worm gear 56 automatically disengages worm 54 and substantially simultaneously the switch-operating arm 88 closes the switch 83 so that current flows through the lamp 56 and illuminates the dial 66. Illumination of the dial 66 attracts the operator's attention and lets him know that the oil should be changed and the device reset. Also, it will be observed that when the device is reset as shown in Fig. 6, switch-operating arm 88 occupies a position beyond the switch 83 so that the latter will be open when worm gear 56 is again engaged with worm gear 54. Thus the switch remains open until the worm gear again makes substantially a complete revolution, at which time it is again closed and the dial 56 again illuminated.

It is to be understood that the form of the invention herewith shown and described is to be taken as a preferred example of the same and that various changes in the size, shape and arrangement of the parts may be resorted to without departing from the spirit of the invention or the scope of the appended claims.

Having thus described the invention, I claim:

1. In a device of the character described, a housing; reduction gearing in said housing adapted for attachment to and to be driven by the speedometer cable of an automotive vehicle, said reduction gearing including a worm and a worm gear, said worm gear normally driven by said worm and mounted for axial sliding movement into and out of engagement therewith, a series of teeth being cut away at the periphery of said worm gear so that the latter automatically disengages the worm when the cutaway segment moves into register with the worm; stop means on said housing projecting toward said worm gear; a lateral projection on said worm gear disposed to engage said stop means when the worm gear is retracted axially away from the worm and operative when engaged with the stop means to prevent rotation of the worm gear in at least one direction, said projection being located circumferentially with respect to the worm gear so as to position the teeth immediately in front of the cut-away peripheral portion for engagement with the worm; and mileage indicator means having an indicator element rotatably and axially coactive with said worm gear, said indicator element being rotatably driven by said worm gear whereby to indicate visibly the angular movement of the latter and also comprising a manual actuator for moving the worm gear axially into and out of engagement with the worm and for rotatably adjusting said worm gear with respect to said worm.

2. In a device of the character described, a housing; reduction gearing in said housing adapted for attachment to and to be driven by the speedometer cable of an automotive vehicle, said reduction gearing including a worm and a worm gear, said worm gear normally driven by said worm and mounted for axial sliding movement into and out of engagement therewith; mileage indicator means having an indicator element rotatably and axially coactive with said worm gear, said indicator element being rotatably driven by said worm gear whereby to indicate visibly the angular movement of the latter and also comprising a manual actuator for moving the worm gear axially into and out of engagement with the worm and for rotatably adjusting said worm gear with respect to said worm; a dial behind said indicator element; indicia on said dial correlating angular movement of said indicator element and the number of miles traversed by the vehicle; additional means for automatically disengaging said worm and said worm gear after each substantially complete revolution of the worm gear; an electrical circuit including lamp means arranged to illuminate said dial and normally open switch means in proximity to said worm gear; and means carried by said worm gear and co-ordinating with said disengaging means for closing said switch means at substantially the same time the worm is disengaged from the worm gear.

ERNEST E. JELLISON.

REFERENCES CITED

The following references are of record in the file of this patent:

UNITED STATES PATENTS

| Number | Name | Date |
|---|---|---|
| 252,285 | Wohnlich | Jan. 10, 1882 |
| 1,188,833 | Rinebold | June 27, 1916 |
| 1,195,494 | Nichols | Aug. 22, 1916 |
| 1,326,895 | Holt | Dec. 30, 1919 |
| 1,534,276 | Locklin | Apr. 21, 1925 |
| 1,564,583 | Koudriavzeff et al. | Dec. 8, 1925 |
| 2,130,290 | Polta et al. | Sept. 13, 1938 |